Jan. 3, 1950 P. J. YARMAN 2,493,562
LOADING PALLET
Filed April 4, 1947
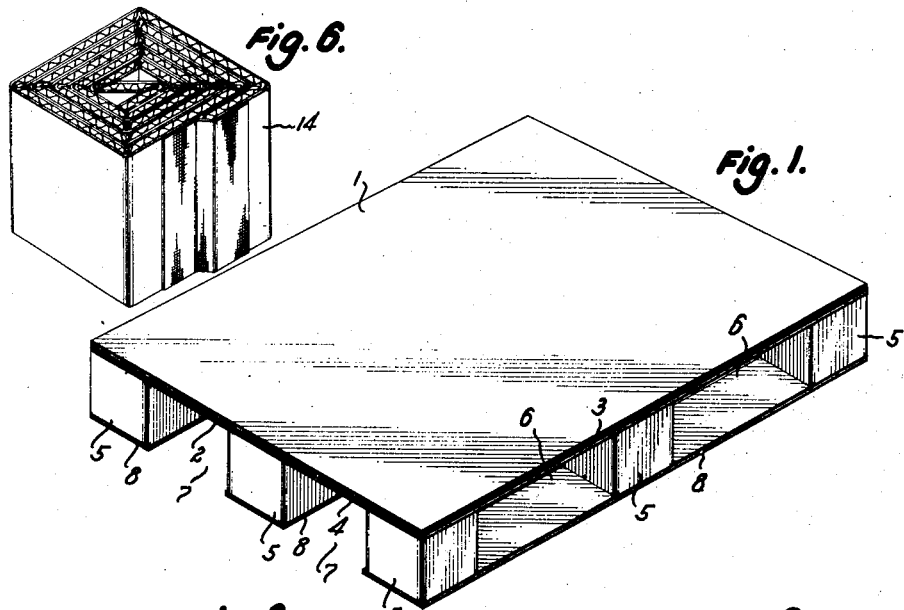
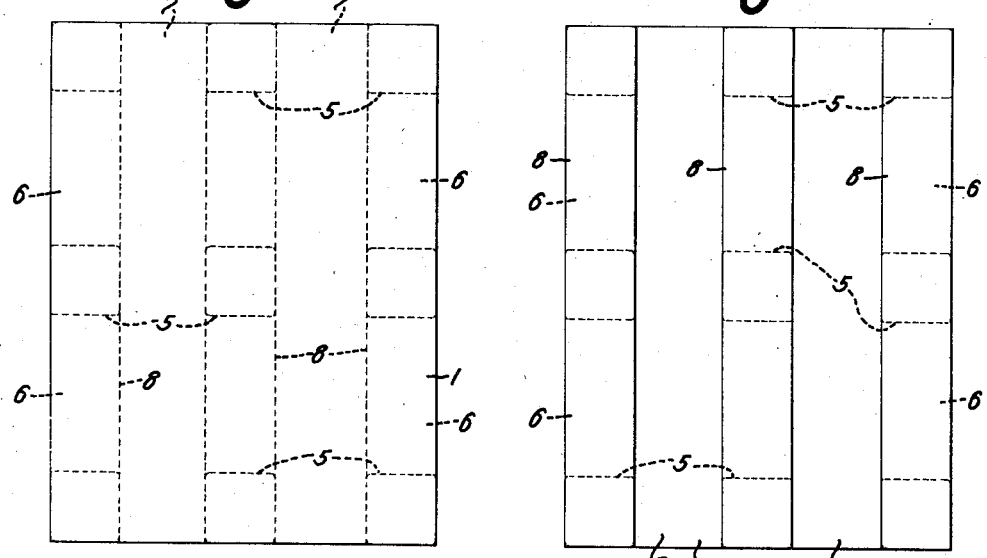
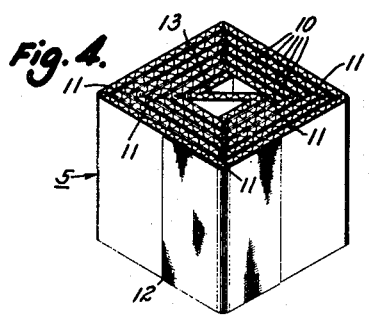
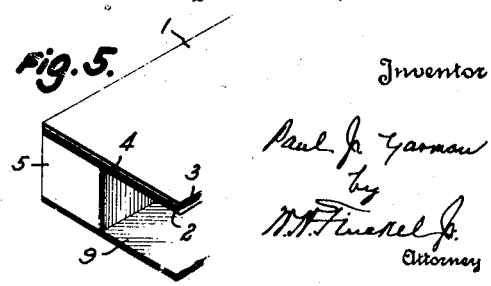
Inventor
Paul J. Yarman
by
N. F. Finckel Jr.
Attorney Patented Jan. 3, 1950

2,493,562

UNITED STATES PATENT OFFICE 2,493,562

LOADING PALLET

Paul J. Yarman, Barberton, Ohio, assignor to The Ohio Boxboard Company, Rittman, Ohio, a corporation of Ohio Application April 4, 1947, Serial No. 739,325

5 Claims. (Cl. 248—120)

This invention relates to loading pallets, and it has special reference to such pallets made of paperboard material and disposable after use if desired, although constructed in such a manner as to afford adequate strength not only to support a desired load temporarily, as during storage and shipment of the articles loaded upon it, but to make possible its re-use.

One object of the invention is to provide a loading pallet which, being made of paperboard material, is cheaper than similar pallets made of wood, such as plywood, both as to the material of which it is constructed and its fabrication, while at the same time furnishing a pallet having characteristics of form and strength adequate for the handling of the usual loads in the customary manner.

Another object is to provide a loading pallet of the so-called four-way, or multiway, type now in favor with manufacturers and handlers of various commodities, which makes possible approach to, and insertion for transportation, of the forks of a fork truck or the like from various angles, and particularly from either side or either end of the pallet, as is now approved and desired.

In accordance with present material handling practice, articles are loaded upon pallets at convenient points of production or assembly of the articles, for example at a machine, a packaging station, or the like, and the loaded pallets are picked up by fork or similar trucks and transported to a storage warehouse or loading dock where they may be assembled and stacked, with the articles carried by them, as units, for present or future loading into cars or other transport vehicles for shipment. As indicated, the pallet becomes a part of the unit of articles loaded upon it and may be stored and/or shipped with such articles. Obviously, therefore, there may be a great many pallets in storage with their units, and hence out of active service, at any time, and the cost of such pallets is hence a considerable item of maintenance.

Also, pallets constantly in service and re-used become damaged, and their upkeep and repair is a matter of no inconsiderable cost. Thus, the provision of a pallet of cheap but sufficiently durable material and construction, and which at the same time is of a type familiar and acceptable to the ordinary user, is of major importance, and a still further object of the invention is the provision of such a pallet.

In the accompanying drawings illustrating the invention, in the several figures of which like parts are similarly designated.

Fig. 1 shows, in perspective, viewed from above, a paperboard pallet embodying the features of the invention, Figs. 2 and 3 are, respectively, a top plan view and a bottom plan view of the pallet shown in Fig. 1.

Fig. 4 is an enlarged perspective view looking down upon a preferred form of paperboard spacer block or leg for the pallet.

Fig. 5 shows, in fragmentary perspective similar to Fig. 1, a modified form of the pallet, and Fig. 6 is a view similar to Fig. 4, but showing a modification of the spacer block or leg construction.

Having reference particularly to Figs. 1 to 4, it will be seen that the pallet comprises a platform or upper surface member formed preferably of two sheets of similar double faced corrugated board 1 and 2, with the corrugations of their corrugated layers 3 and 4, respectively, running in the directions to cross each other, and preferably at right angles to each other, thus imparting to the platform the maximum strength inherent in the paperboard material.

To the under surface of this platform are attached, preferably by a suitable adhesive, a plurality (nine as shown) of spacer blocks or legs 5 arranged in three rows of three blocks each located adjacent to the edges and medially of the platform, thus providing the maximum of support for the platform while at the same time furnishing spaces 6 and 7 at the sides and ends, respectively, of the pallet for the introduction of the forks of a truck.

In view of the relative arrangement and spacing of the blocks or legs 5 (see particularly Figs. 2 and 3), it will be apparent that the forks of a truck may be introduced also from any corner of the pallet.

As shown in Figs. 1 to 3, the lower ends of the legs or blocks may, for purposes of rigidity and strength, be joined in each row by a strip 8 of double faced corrugated board with the corrugations of its corrugated layer running lengthwise for greatest longitudinal rigidity, to provide a supporting base means for the blocks or legs, while at the same time affording openings between them through which the wheels of a loading truck or fork may have ground contact. If desired, however, the supporting base means may comprise a continuous sheet of the corrugated board coextensive with the platform above it, as partially shown at 9, Fig. 5.

In order to provide spacer blocks or legs 5 of maximum strength, and of paperboard rather than wood, it is preferred to form these blocks or legs in the manner shown in detail in Fig. 4. As therein shown, the block or leg 5 comprises a plurality of four-sided sections 10 of double faced corrugated board the ends of each of which are preferably butt-joined as at 11, and these sections are intimately nested to produce a compact column formation secured by an exteriorly applied gummed tape or the like 12. Within the innermost section, and providing a rigid core therefor, is a Z-shaped member 13 which has a lateral bearing in each of the four corners, or inner angles, of the innermost section.

Instead of employing a plurality of separate nested sections 10, 13, the spacer block or leg may be formed of a continuous strip 14, Fig. 6, of the corrugated board suitably scored and folded upon itself to produce the box-like formation of increasing lateral dimensions.

In either case, in order to afford the maximum resistance to compression stresses vertically of the spacer blocks or legs, the corrugated board of which they are made is arranged with its corrugations running vertically.

Various changes and modifications are considered to be within the principle of the invention and the scope of the following claims.

What I claim is:

1. A loading pallet formed entirely of paperboard, and including a platform and a plurality of legs depending therefrom and adapted to support the platform in elevated position above a supporting surface, each of said legs being of block-like formation having a hollow core and comprising a plurality of layers of paperboard material extending substantially normal to said platform, each of said layers constituting a separate member in internested association with the members constituting the other layers, and a core member disposed in said hollow core and serving to support said layers interiorly of the leg member, the paperboard material of the layers of the legs including a corrugated sheet with its corrugations disposed substantially normal to said platform.

2. A loading pallet as claimed in claim 1, in which the hollow core is of rectangular formation, and the core member is of Z shape and is arranged in said hollow core with the outer angles and free ends of its Z shape bearing in the four inner angles of the inner layer.

3. A loading pallet formed entirely of paperboard, and including a platform and a plurality of legs depending therefrom and adapted to support the platform in elevated position above a supporting surface, each of said legs being of block-like formation having a hollow core and comprising a plurality of layers of paperboard material extending substantially normal to said platform, each of said layers constituting a separate member comprising a four-sided element made of a strip of paperboard material scored and folded to rectangular formation with the free ends of the strip butt-joined and in internested association with the members constituting the other layers, and a core member disposed in said hollow core and serving to support said layers interiorly of the leg member, the paperboard material of the layers of the legs including a corrugated sheet with its corrugations disposed substantially normal to said platform.

4. A leg structure for paperboard loading pallets, comprising a plurality of layers of corrugated paperboard material disposed substantially in block form about a common axis and with a hollow axial core, the corrugations of said layers being disposed substantially parallel to said axis, and a core member disposed within said hollow core and having means providing bearings against adjacent layers to support said layers interiorly of the leg member.

5. A leg structure for paperboard pallets, as claimed in claim 4, in which each layer comprises a separate four-sided element formed of a strip of material bent to rectangular shape with its ends butt-joined.

PAUL J. YARMAN.

REFERENCES CITED

The following references are of record in the file of this patent:

UNITED STATES PATENTS

| Number | Name | Date |
| --- | --- | --- |
| 2,432,295 | Donahue | Dec. 9, 1947 |
| 2,444,184 | Cahners | June 29, 1948 |

OTHER REFERENCES

H. E. Fletcher Co., Publication on page 4 of "The Palletizer" for June 1946.